(12) United States Patent
Corts (10) Patent No.: US 9,284,978 B2
(45) Date of Patent: Mar. 15, 2016

(54) OIL FILM BEARING

(71) Applicant: CORTS Engineering GMbH & Co. KG, Remscheid (DE)

(72) Inventor: Jochen Corts, Remscheid (DE)

( * ) Notice: Subject to any disclaimer, the term of this patent is extended or adjusted under 35 U.S.C. 154(b) by 0 days.

(21) Appl. No.: 14/350,001

(22) PCT Filed: Oct. 4, 2012

(86) PCT No.: PCT/IB2012/002511
§ 371 (c)(1),
(2) Date: Apr. 4, 2014

(87) PCT Pub. No.: WO2013/050876
PCT Pub. Date: Apr. 11, 2013

(65) Prior Publication Data
US 2014/0248007 A1   Sep. 4, 2014

Related U.S. Application Data

(60) Provisional application No. 61/543,235, filed on Oct. 4, 2011.

(51) Int. Cl.
| | |
|---|---|
| *F16C 32/06* | (2006.01) |
| *F16C 13/02* | (2006.01) |
| *F16C 33/20* | (2006.01) |
| *F16C 33/26* | (2006.01) |

(52) U.S. Cl.
CPC ............ *F16C 32/0629* (2013.01); *F16C 13/02* (2013.01); *F16C 33/20* (2013.01); *F16C 33/26* (2013.01)

(58) Field of Classification Search
CPC ....... F16C 32/0629; F16C 33/20; F16C 33/26
See application file for complete search history.

(56) References Cited

U.S. PATENT DOCUMENTS

| 4,915,510 | A | * | 4/1990 | Arvidsson | ........................ 384/99 |
| 4,944,609 | A | * | 7/1990 | Salter et al. | ................... 384/118 |
| 5,174,916 | A | * | 12/1992 | Osgood | .......................... 508/582 |
| 6,149,309 | A | * | 11/2000 | Wojtkowski et al. | ......... 384/276 |
| 2007/0227299 | A1 | * | 10/2007 | Marchiando et al. | ........... 75/244 |

FOREIGN PATENT DOCUMENTS

WO    WO 9501903 A1 *  1/1995

* cited by examiner

*Primary Examiner* — Thomas R. Hannon
(74) *Attorney, Agent, or Firm* — Briggs and Morgan, P.A.

(57) ABSTRACT

An oil film bearing for supporting a roll neck in a rolling mill, suitable in particular for transmitting high bearing forces when the bearing partners are slightly and slowly moved with respect to each other, has a bearing surface into which are incorporated rods made of a friction-reducing material (e.g., low friction compounds), which extend in a substantially perpendicular direction to the bearing surface. The rods are deformed during heat processing to define a bearing surface. The bearing partner, such as a roll sleeve, rests on the free face of the deformed rods.

15 Claims, 10 Drawing Sheets

OIL FILM BEARING

TECHNICAL FIELD

The invention is directed to a further advancement in the field of oil film bearings and more particularly to bearings used to rotatably support the necks of rolls in a rolling mill.

BACKGROUND OF THE INVENTION

An example of an oil film bearing is the "MORGOIL" bearing, which is available from Siemens A G, Linz, Austria. The MORGOIL bearing has a hydrodynamic design which distributes the bearing load over a relatively large area. A film of oil on which the bearing operates has immense load carrying capacity and, when functioning as intended, eliminates wear caused by metal-to-metal contact. When used on a rolling stand, the oil film is constantly maintained by the hydrodynamic action of the rotating sleeve which fits over the roll neck, and a nonrotating bushing mounted in the chock.

A rolling mill oil film bearing typically comprises a sleeve axially received on and rotatably fixed to a roll neck. The sleeve is surrounded by a bushing contained in a chock mounted in a rolling mill housing. In service, the sleeve is rotatably supported on a thin film of oil hydrodynamically maintained at the bearing load zone between the sleeve and the bushing.

The sleeves may be either internally cylindrical for use on cylindrical or "straight" roll necks, or they may be internally tapered for use on tapered roll necks. Moreover, the sleeves may be "self locking" or "non-locking". Self locking sleeves are frictionally fixed to the roll necks by interference fits, whereas non-locking sleeves require keys or the like to effect a mechanical inter-engagement with the roll necks.

Figure 1:
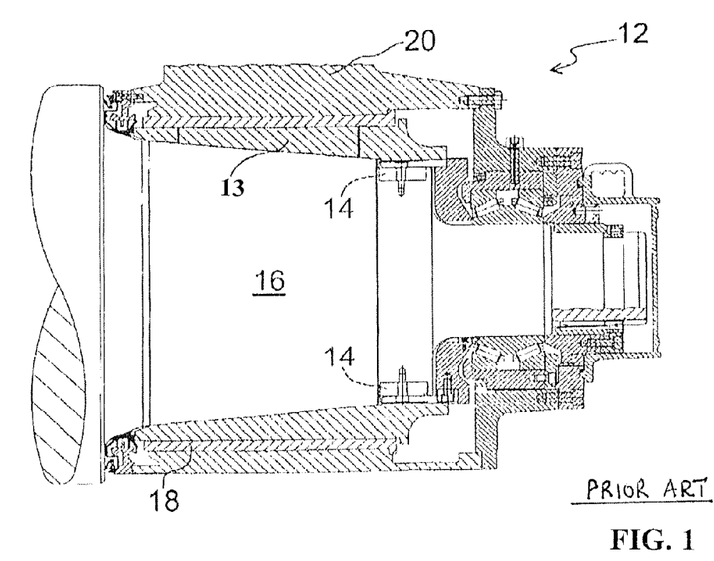
FIG. 1 is a cross-sectional view of a rolling mill oil film bearing of the prior art.

With reference to FIG. 1, one such sleeve is shown at 13 as a component part of a rolling mill oil film bearing 12. The sleeve 13 is removably received on a tapered section 16 of the roll neck and is rotatably fixed to the roll neck by keys 14 or the like. The sleeve is surrounded by a bushing 18 and fixed in a bearing chock 20. In service, as previously noted, the sleeve is rotatably supported on a thin film of oil (not shown) hydrodynamically maintained at the bearing load zone between the sleeve and the bushing.

Figure 2:
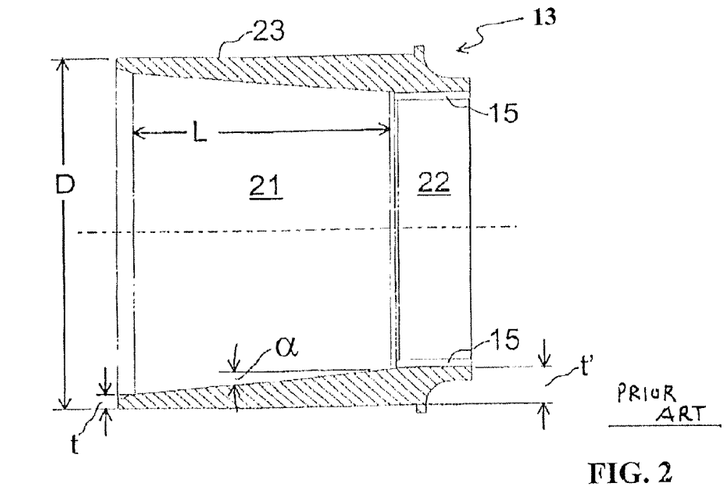
FIG. 2 is a cross-sectional view of a sleeve of a rolling mill oil film bearing of the prior art.

With reference to FIG. 2, it will be seen that the sleeve 13 has an internally tapered section 21 with a length L, an end section 22 extending axially beyond the outboard end of the internally tapered section, and a cylindrical outer surface 23 surrounding the internally tapered section. The cylindrical outer surface has a diameter D (also commonly referred to as the "journal" diameter). The internally tapered section has a taper angle a, a minimum thickness t at its inboard end, and a maximum thickness t' at its outboard end adjacent to the end section 22. Keyways 15 co-act in mechanical interengagement with the keys 14, with both the keys and the keyways being located outside of the internally tapered section 21 and exclusively within the end section 22.

Figure 3:
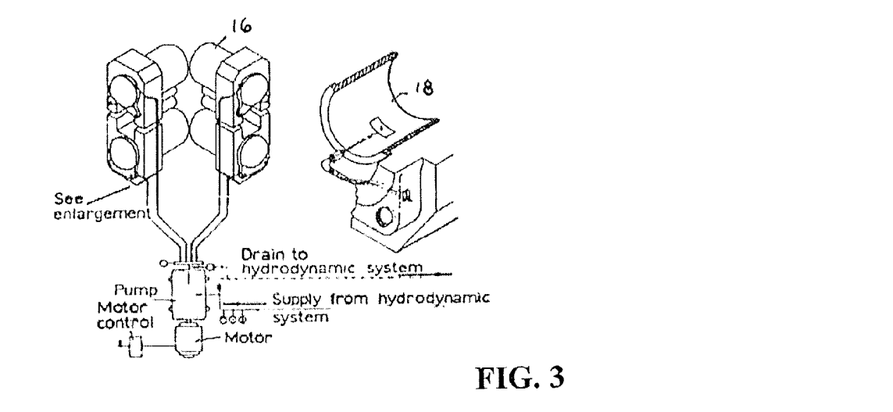
FIG. 3 is a diagram of a lubrication system for oil film bearings.

With reference to FIG. 3, it will be seen that a modern "MORGOIL" lubrication system delivers a controlled supply of oil to the bearings. When the roll is turning, the sleeve, fitted over the roll neck and secured by a key to prevent slippage, turns within the stationary bushing which is secured to the chock. Bearing load is distributed over the entire load zone and the continuity of the oil film is ensured by delivery of the oil through internal passages within the chock to the journal. Hydrostatics are used in oil film bearings when sustained operation under high load and low speed is required, when the mill is operating in a reversing mode, frequently changing the turning direction or when the mill is required to start under load after long stops. A high pressure pump feeds lubricant into the load zone of the bearings, assuring full film operation of the bearing under all rolling conditions.

Figure 4:
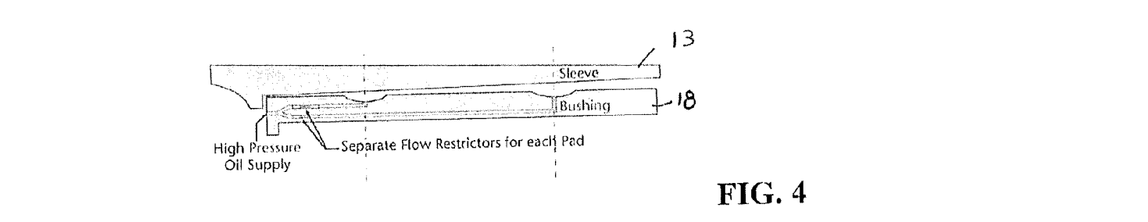
FIG. 4 is a cross-sectional view of a sleeve and bushing of an oil film bearing.

FIG. 4 illustrates a cross-sectional view taken through a sleeve and bushing showing lubrication conduits, and ports for introducing and expelling lubricant.

Figure 5A:
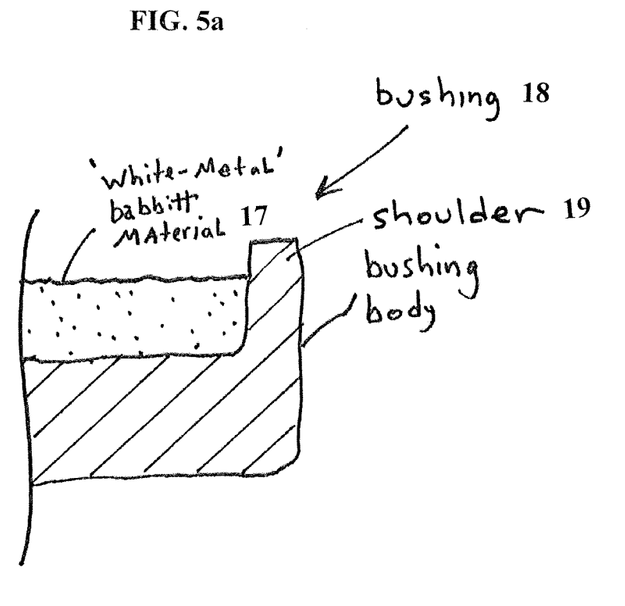
FIG. 5a is a cross-sectional view of a bushing of an oil film bearing.
Figure 5B:
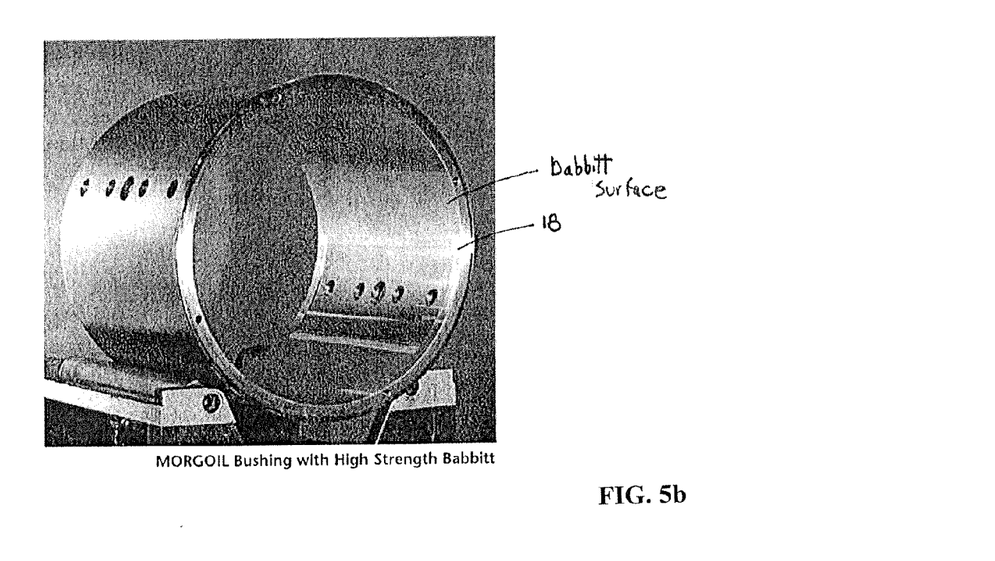
FIG. 5b is a perspective view of a bushing of an oil film bearing.

To protect the bushing body against mechanical destruction from metal-to-metal contact with the sleeve, the bushing body is filled with so called white metal, which is a relatively soft metal providing emergency bearing characteristics. FIG. 5a is a section through the bushing 18 and shows that the quite ductile white metal filling 17 is supported by shoulders 19. With the continuing effort to reduce the size of the mills while increasing their output, the specific load capacity of bearings has increased as well. To meet this need MORGOIL introduced a High Strength Babbitt (HSB) white metal bearing material. This proprietary babbitt resulted in higher bearing capacity. FIG. 5b illustrates a MORGOIL bushing with HSB.

Significant limitations of the standard white metal bushings as well as the HSB bushings includes the risk of segregation between the steel bushing and white metal, high cost, and limited bearing capacity during emergency operating conditions, such as low oil pressure or non-stable oil film conditions.

SUMMARY OF THE INVENTION

The present invention provides an oil film bearing having improved operating characteristics relative to the traditional MORGOIL bearings, including the HSB bushings.

An oil film bearing in accordance with the present invention, suitable in particular for transmitting high bearing forces when the bearing partners are slightly and slowly moved with respect to each other, has a bearing surface into which are incorporated rods made of a friction-reducing material (e.g., low friction compounds), which extend in a substantially perpendicular direction to the bearing surface. The rods are deformed during heat processing to define a bearing surface. The bearing partner, such as a roll sleeve, rests on the free face of the deformed rods. The low friction material can include a polytetrafluoroethylene (PTFE) material or other known materials such as ultra high molecular weight (UHMW) polymers. In a preferred embodiment, a glass-reinforced PTFE material is utilized to define the bearing surface.

In one embodiment of the present invention, an oil film bearing for rotatably supporting a roll neck in a rolling mill includes a rotating sleeve section and a bushing. The bushing includes a bearing block having a low-friction bearing surface. The outer surface of the rotating sleeve section is rotatably supported on a film of oil on the low-friction bearing surface.

The present invention is also directed to a bushing for use in an oil film bearing of the type employed to rotatably support a roll neck in a rolling mill. The bushing has an inner surface engaging a rotating sleeve section. The outer surface of the sleeve section is adapted to be rotatably supported on a film of oil at a load zone of the bearing. The bushing comprises a bearing block and a low-friction bearing surface connected to the bearing block and supporting the outer surface of the rotating sleeve section.

A bearing assembly in accordance with the present invention offers higher load capacity for the same size bearing with reductions in both initial and operational cost. Furthermore the specific low friction bearing surface offers a significantly lower coefficient of friction as compared to the given white metal technologies. This yields significantly better protection of the sleeves under any kind of emergency situation. The low friction bearing surface is also completely resistant against any kind of chemical influences resulting from the oil or any kind of inclusions in the oil. Therefore the present invention offers a significantly longer lifetime as compared to standard white metal bushes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions (for example, in non-rotational applications) do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION OF THE INVENTION

Figure 6:
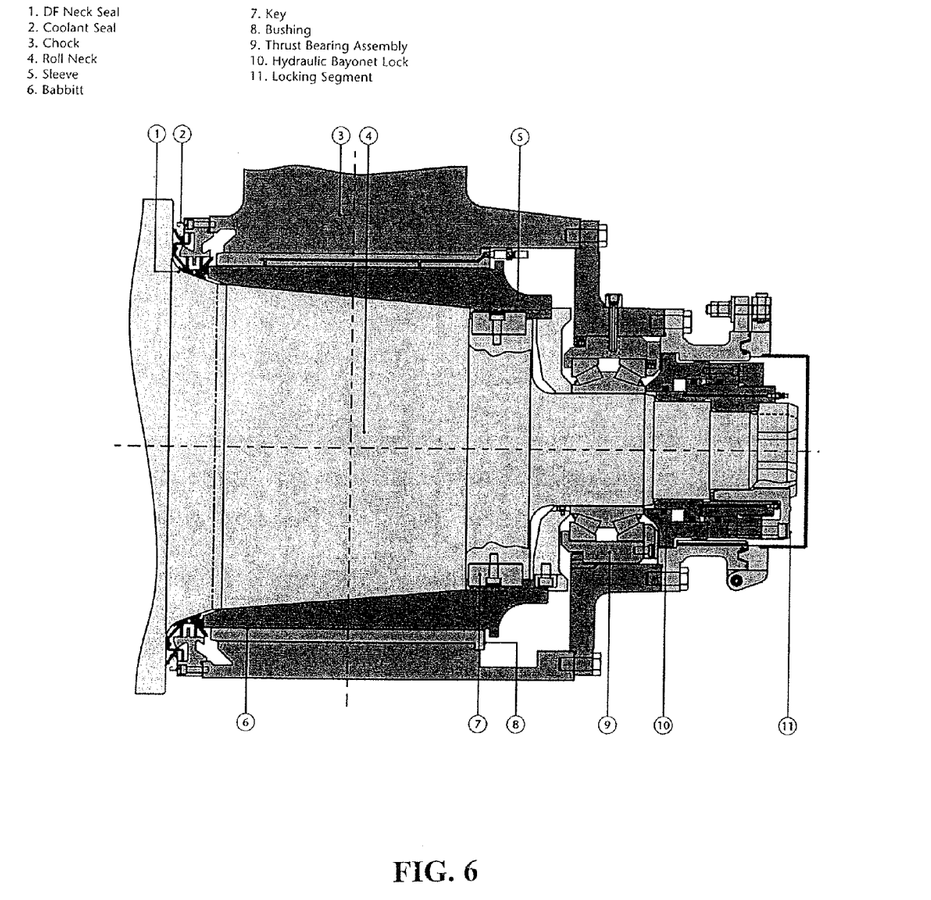
FIG. 6 is a cross-sectional view of a bearing assembly suitable for use with a bushing of the present invention.

Referring to the drawings, FIG. 6 is a cross sectional view taken through a bearing assembly having a neck seal 1, coolant seal 2, chock 3, roll neck 4, sleeve 5, babbitt 6, key 7, bushing 8, thrust bearing assembly 9, hydraulic bayonet lock 10 and locking segment 11. FIG. 6 depicts a MORGOIL KL-type bearing. The present invention primarily relates to the bushing 8 and babbitt 6.

Figure 7:
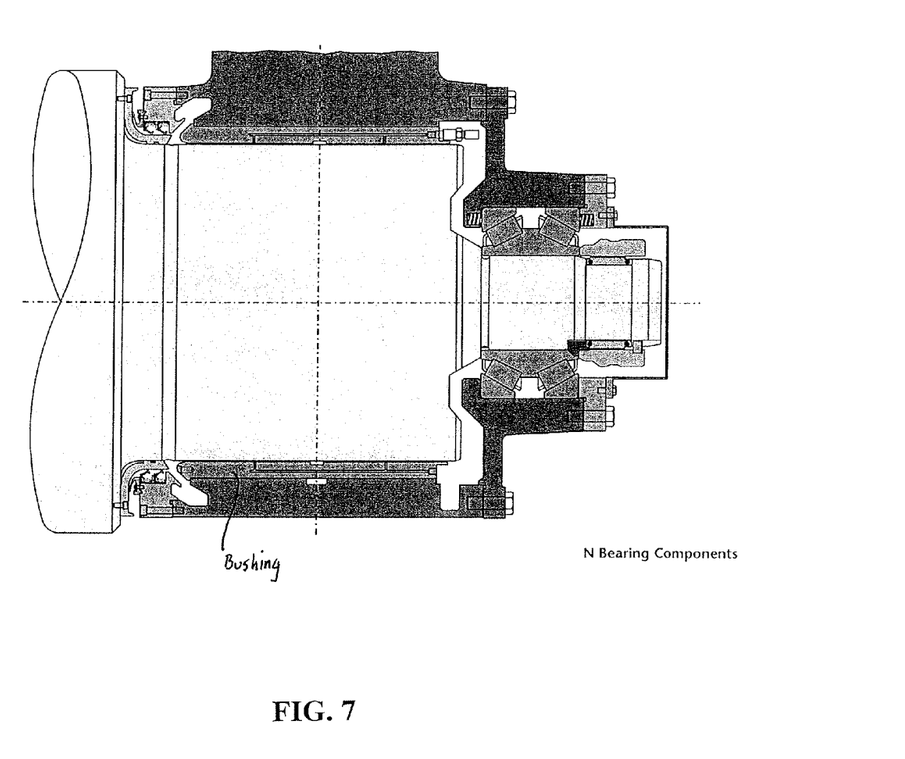
FIG. 7 is a cross-sectional view of a bearing suitable for use with a bushing of the present invention.
Figure 8:
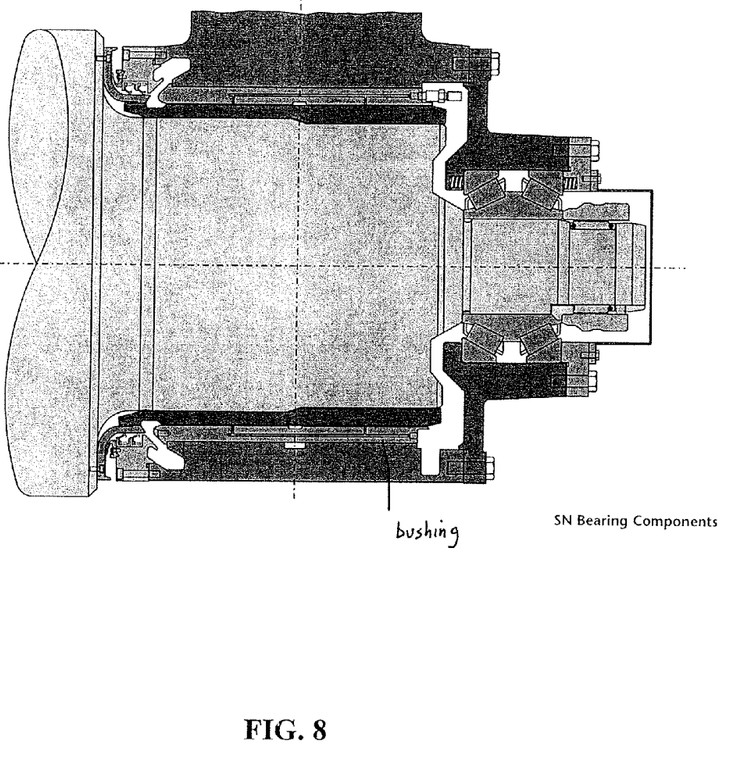
FIG. 8 is a cross-sectional view of a bearing suitable for use with a bushing of the present invention.

FIG. 7 is a cross-sectional view of a MORGOIL type-N bearing also suitable for use with a novel bushing 8 of the present invention. FIG. 8 is a cross-sectional view of a MORGOIL type SN bearing, which is also suitable for use with a novel bushing 8 of the present invention. Applications of the present invention are not limited to particular classes of oil-film bearings. A wide variety of bearings could be practiced in accordance with the present invention. Aspects of the present invention can be suitably applied across a wide variety of bearing types, size, classification and designs.

Figure 9:
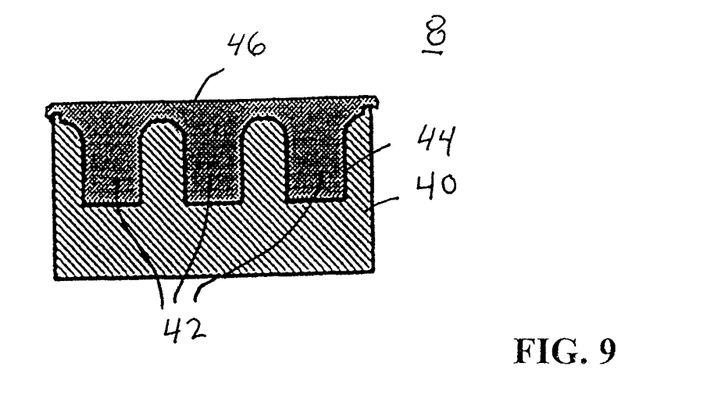
FIG. 9 is a cross-sectional view of a bushing according to one embodiment of the present invention, subsequent to heat deformation.

FIG. 9 illustrates the babbitt surface 46 of bushing 8 of the present invention. Babbitt surface 46 defines a slide bearing. As described above, an oil film is established between babbitt surface 46 and a sleeve or other component. Bushing 8 has a bearing block 40 or support which can have any shape and form and in case of oil film bearings is a ring into which are incorporated rods 42 made of a friction-reducing material, in particular glass-reinforced polytetrafluoroethylene (PTFE), which extend in a substantially perpendicular direction to the bearing surface. The bearing partner, such as sleeve 5 in FIG. 6, rests on the free face of the rods.

Figure 10:
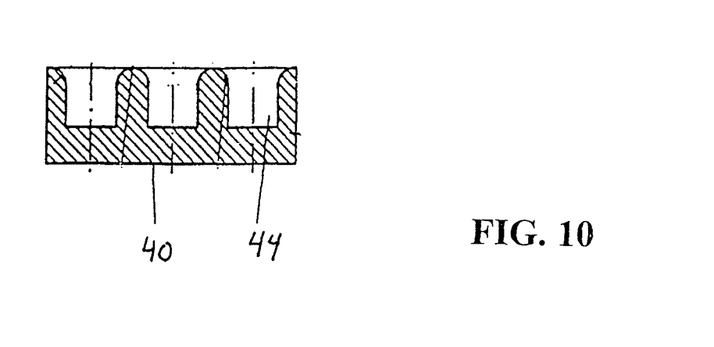
FIG. 10 is a cross-sectional view of a bushing according to another embodiment of the present invention.
Figure 11:
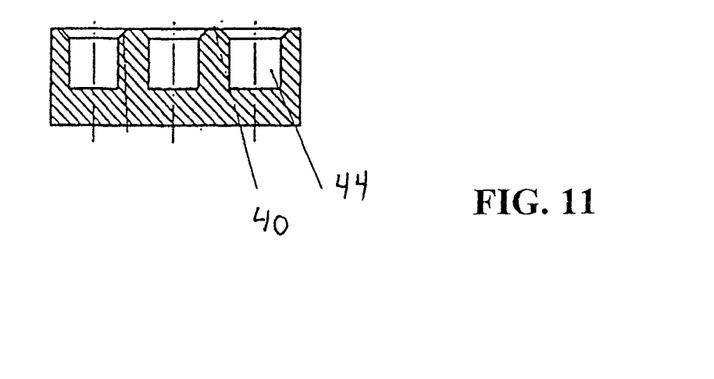
FIG. 11 is a cross-sectional view of a bushing according to another embodiment of the present invention.

FIGS. 10 and 11 are cross-sectional views taken through bushing 8 showing block 40 and boreholes 44. In the illustrated embodiment, the boreholes 44 are generally cylindrical and may have a surface texture promoting adhesive between the block 40 and the rods 42. In other embodiments, the boreholes 44 may be non-cylindrical. In yet other embodiments, the boreholes 44 may include undercuts or other structure to promote the interconnection between the rods 42 and the block 40 before and/or subsequent to heat deformation. For example, the boreholes 44 may include threads or similar structure. A variety of undercuts or other structure could be employed within the boreholes 44 to promote the connection between the rods 42 and the block 44. The rods 42 need not be cylindrical but could take another form. The rods 42 need not match the borehole 44 configuration, for example a square rod 42 could be inserted into a round borehole 44 or vice-versa a round or oval rod in a square or oval hole. Rods 42 may assume a variety of different configurations. For example, two or more differently sized rods 42 may be inserted into two or more differently sized boreholes 44. In some applications, it may be beneficial to include two or more differently sized rods 42 and boreholes 44 to improve coverage of the bearing surface. As shown, the upper edges of the boreholes 44 may be chamfered, beveled or otherwise configured.

Figure 12:
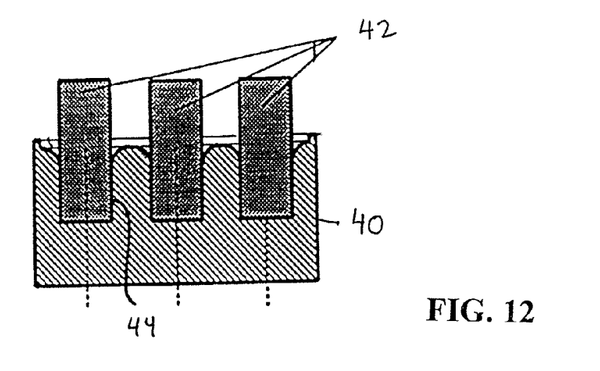
FIG. 12 is a cross-sectional view of the bushing of FIG. 9, prior to heat deformation.

FIG. 12 is a cross-sectional view of bushing 8 showing block 40 and rods 42 prior to heat deformation. Rods 42 are inserted into the boreholes 44 during a manufacturing process. Rods 42 may include rods of different diameters. For example, two or more differently sized rods 42 may be inserted in two or more differently sized boreholes 44. The use of differently sized rods 42 may be beneficial so as to maximize the coverage of the rod material subsequent to heat deformation. FIG. 9 shows rods 42 subsequent to heat deformation. Additional machining of the deformed ends of rods 42 may be required to yield a suitable bearing surface 46.

Figure 13:
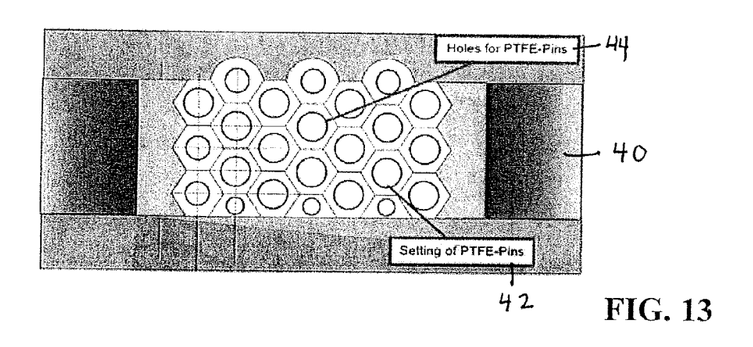
FIG. 13 shows the bushing of FIG. 9 prior to a heat setting process.
Figure 14:
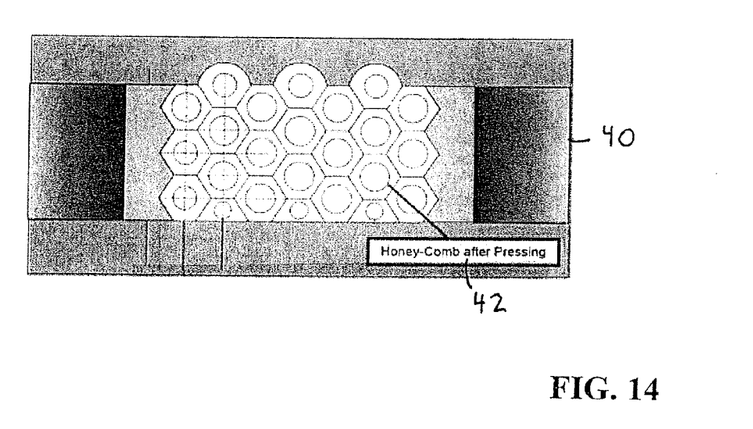
FIG. 14 shows the bushing of FIG. 13 subsequent to a heat setting process.

FIG. 13 shows the bushing 8 with rods 42 inserted into boreholes 44. FIG. 14 shows the bushing of FIG. 13 subsequent to a heat setting process during which the rod 42 ends are deformed to define a bearing surface.

Figure 15:
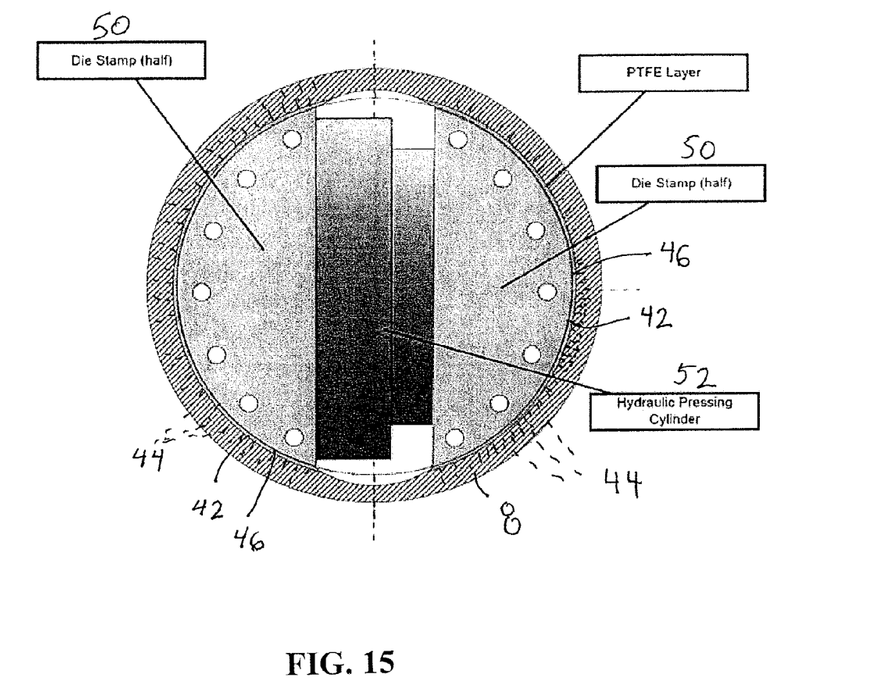
FIG. 15 depicts a manufacturing process of an oil film bearing in accordance with the present invention.

FIG. 15 depicts a manufacturing process during which a pair of semi-cylindrical dies 50 are inserted into the bushing 8 and are expanded by a hydraulic cylinder 52. Using force and temperature, the dies 50 engage and deform the rods 42 to define a generally cylindrical PTFE bearing surface.

The manufacturing process would include steps of defining boreholes in the bushing block 40, inserting PTFE rods 42 into the boreholes, heat treatment of the PTFE rods 42 to temperature resulting in a degree of plasticity, inserting the die halves 50 and hydraulic cylinder 52 into the bushing block 40, and expanding the die halves 50 to engage and deform the PTFE rods 42 into a generally cylindrical PTFE bearing surface. Additional machining steps of the deformed rod 42 ends may be necessary to configure the bearing surface.

In accordance with the present invention, the boreholes 44 may be perpendicular to the bearing surface or may be offset relative to the bearing surface. The boreholes 44 may be closed or open-ended, and may include holes of two or more different sizes. Moreover, the boreholes 44 may be cylindrical, structured or tapered along their lengths. The top edges of the boreholes 44 may be chamfered.

In accordance with the present invention, the rods 42 may be formed from a low friction material such as, but not limited to, a polytetrafluoroethylene (PTFE) material, or materials made from other types of low-friction polymers such as ultra high molecular weight (UHMW) polymers. The rods 42 may be reinforced with glass fibers or other strengthening fibers such as, but not limited to, KEVLAR, carbon fiber, ceramics, and nano-fibers. The rods 42 may be equally sized, or two or more differently sized rods 42 can be utilized within a given bushing. For example, the rods within a bushing may have different diameters, lengths, materials, etc.

The bearing block 40, structure or ring of the oil film bearing of the present invention is preferably formed of a steel alloy, such as a quenched and tempered and/or hardened steel alloy. The area of the bearing surface inside the bearing block, ring or structure may be open to the ends or closed by raised edges.

The rods 42 may be arranged in the bearing block 40 in rows which run perpendicular to the bearing surface, or in any appropriate angle to the preferred direction of movement. The rods 42 may be placed in rows, with neighboring rows being offset from each other by a distance such as, but not limited to, a distance equal to half of the spacing between the rods in a row.

The low friction bearing surface of the oil film bearing of the present invention may be covered by additional and specific coatings to increase the surface protection and/or reduce the overall coefficient of friction. Novel coatings, such as advanced nanoparticle coatings, may be utilized to provide further protection or enhanced performance for the low friction bearing surface. Lubricants on the bearing surface may include specific additives which optimize their use on low friction surfaces. The lubricants may also include additives which protect the entire oil system or circuit of the entire oil-film application against contamination from specific types of bacteria which cause bio-corrosion.

Sensors may be provided within the bearing of the present invention to provide temperature, flow and/or pressure information. Sensors may also be provided to provide information relevant to conditions such as, but not limited to, lubrication conditions, the presence of water contamination, and pH conditions.

The sensors may also be provided to detect the presence of certain biologics, such as corrosion-causing biologics. Microbiologically-Influenced Corrosion (MIC), also known as microbial corrosion or biological corrosion, is the deterioration of metals as a result of the metabolic activity of microorganisms. There are several bacteria known to cause microbiologically influenced corrosion of carbon steels, stainless steels, aluminum alloys and copper alloys in waters and soils with a pH range of approximately 4-9 and a temperature range of approximately 10° C. to 50° C. These bacteria can be broadly classified as aerobic (requiring oxygen to become active) or anaerobic (oxygen is toxic to the bacteria). Sulphate reducing bacteria (SRB) is anaerobic and is responsible for most instances of accelerated corrosion damages to ships and offshore steel structures. Iron and manganese oxidizing bacteria are aerobic and are frequently associated with accelerated pitting attacks on stainless steels at welds.

Figure 16:
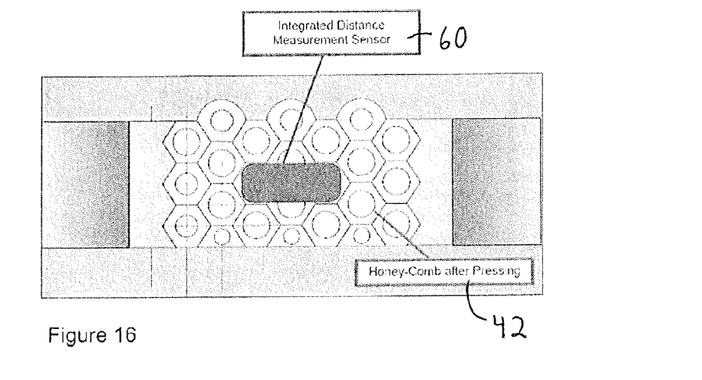
FIG. 16 shows the bushing of FIG. 14 including an integrated distance measurement sensor.

As shown in FIG. 16, a radial distance measurement sensor 60 which dynamically surveys any changes in the oil-film thickness may be integrated into the bushing and/or low friction bearing surface. The measurement may be accomplished via induction (or other techniques), and may be integrated into a specific oil film bearing condition monitoring system as a standalone system and/or integrated into an existing overall mill control system.

Figure 17:
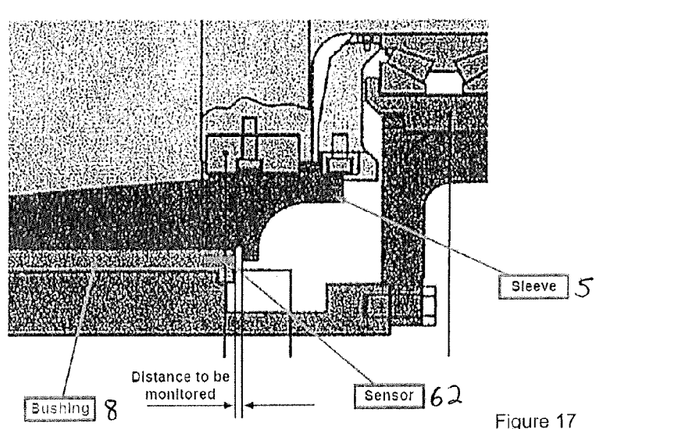
FIG. 17 is a partial view of an oil film bearing with an integrated axial sensor in accordance with the present invention.

As shown in FIG. 17, an additional axial sensor 62 may be integrated into the bushing to survey and control the axial movement and/or displacement of the sleeve. This may be accomplished via induction (though not limited to that approach), and may be integrated into a specific oil-film bearing condition monitoring system as a standalone system and/or integrated into an existing overall mill control system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An oil film bearing for rotatably supporting a roll neck in a rolling mill, said oil film bearing comprising:
    a rotating sleeve section having a generally cylindrical outer surface;
    a generally cylindrical, fiber-reinforced polymer bushing comprising polytetrafluoroethylene (PTFE) or ultra high molecular weight polymer (UHMW) and providing a generally cylindrical bearing surface, wherein the outer surface of the rotating sleeve section is rotatably supported on a film of oil on the bearing surface; and
    a plurality of oil conduits extending through the polymer bushing for supplying pressurized oil between the outer surface of the rotating sleeve section and the polymer bushing to establish the oil film, wherein the bearing surface is defined by a plurality of deformed rods, wherein each of the plurality of rods is received within an opening in a bearing block, wherein the rods are then heat-deformed in a manufacturing process to define the generally cylindrical bearing surface, with said manufacturing process including:

inserting polymer rods into boreholes of the bearing block, heating the polymer rods to a temperature resulting in a degree of plasticity, inserting a pair of generally semi-cylindrical die segments into the bushing, and outwardly forcing, with an externally powered hydraulic cylinder, the die segments toward the bearing block to deform the heated polymer rods into the generally cylindrical bearing surface.

2. The oil film bearing of claim 1, wherein the boreholes are perpendicular to the bearing surface or offset relative to the bearing surface.

3. The oil film bearing of claim 1, wherein the boreholes are closed or open-ended.

4. The oil film bearing of claim 1, wherein the boreholes include holes of two or more different sizes.

5. The oil film bearing of claim 1, wherein the boreholes are cylindrical, structured or tapered along their lengths.

6. The oil film bearing of claim 1, wherein top edges of the boreholes are chamfered.

7. The oil film bearing of claim 1, wherein the bearing block is formed of a steel alloy.

8. The oil film bearing of claim 1, wherein the rods are arranged in rows which run perpendicular or at an angle to a preferred direction of movement.

9. The oil film bearing of claim 8, wherein neighboring rows are offset from each other by an amount greater than or equal to half of the spacing between the rods in a row.

10. The oil film bearing of claim 1, wherein the bearing surface is covered by a coating to increase surface protection and/or reduce an overall coefficient of friction.

11. The oil film bearing of claim 10, wherein the coating comprises a nanoparticle coating.

12. The oil film bearing of claim 1, further comprising a lubricant having an additive which protects an oil system against contamination from bacteria causing bio-corrosion.

13. The oil film bearing of claim 1, further comprising a sensor provided within the bushing to provide temperature, flow and/or pressure information.

14. The oil film bearing of claim 1, further comprising sensors to provide information relevant to lubrication conditions, water contamination, or pH conditions.

15. The oil film bearing of claim 1, further comprising an axial sensor integrated into the bushing to survey and control an axial movement and/or displacement of the sleeve section.

* * * * *